July 11, 1950  G. E. DATH  2,514,568
FRICTION BUFFER
Filed Feb. 3, 1947
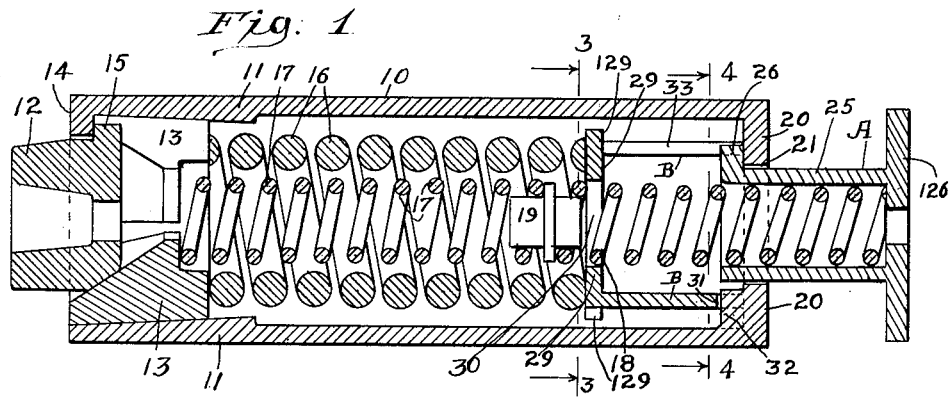
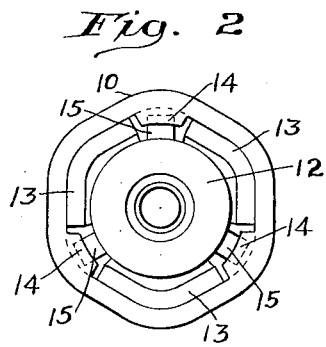
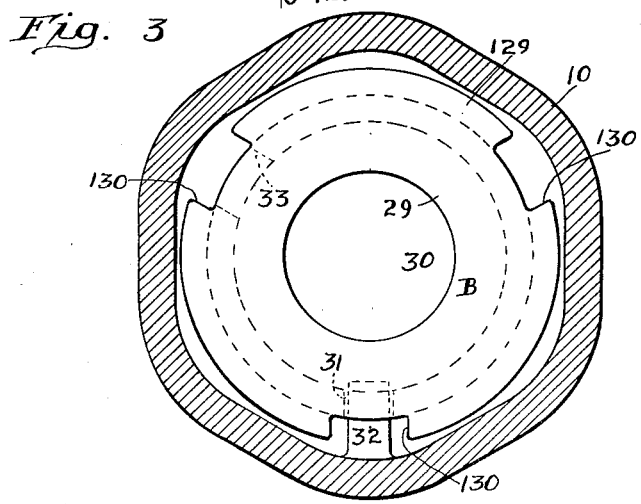
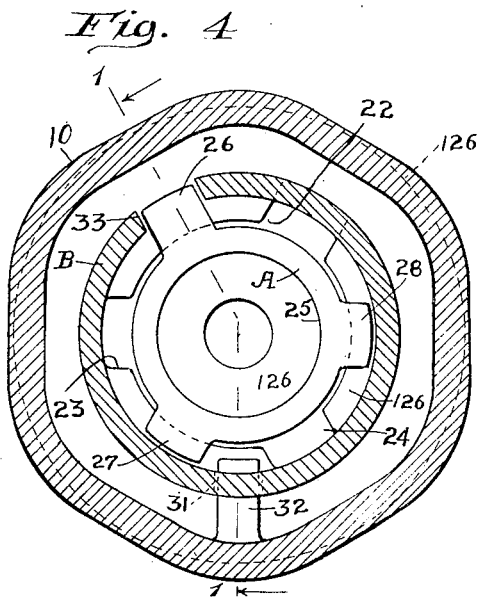
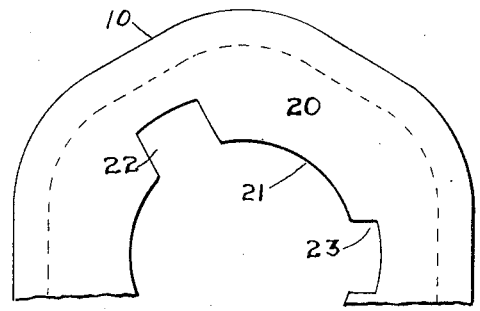
Inventor:
George E. Dath.
By Henry Fuchs.
Atty.

Patented July 11, 1950

2,514,568

UNITED STATES PATENT OFFICE 2,514,568

FRICTION BUFFER

George E. Dath, Mokena, Ill., assignor to W. H. Miner, Inc., Chicago, Ill., a corporation of Delaware Application February 3, 1947, Serial No. 726,069

5 Claims. (Cl. 213—24)

This invention relates to improvements in friction buffers for railway cars.

One object of the invention is to provide a friction shock absorbing mechanism having preliminary spring action, especially adapted for use as a buffing mechanism for railway cars, comprising a friction casing, a friction clutch slidingly telescoped within one end of the casing, a spring cap slidingly telescoped within the other end of the casing, and spring means within the casing opposing inward movement of the friction clutch and spring cap, wherein the spring cap is held assembled with the casing and has its outward movement with respect to the casing limited by interengaging registering stop lugs on the casing and cap, which are brought into registration by turning the cap with respect to the casing, and wherein the cap is locked against turning by an element having shouldered engagement with the casing and cap and which is maintained in locking position by the pressure exerted by said spring means, thereby maintaining the lugs of the cap in registration with the cooperating stop lugs of the casing.

A further object of the invention is to provide a mechanism, as set forth in the preceding paragraph, wherein the means for maintaining the lugs of the spring cap aligned or registered with the stop lugs of the casing comprises interengaging guide means on the cap and locking element in the form of a guideway, extending lengthwise of the mechanism, and a cooperating lug engaged in said guideway, and interengaging means on said locking element and casing, comprising a locking seat and a cooperating projection engaged in said seat.

Other objects of the invention will more clearly appear from the description and claims hereinafter following.

In the accompanying drawing forming a part of this specification, Figure 1 is a longitudinal, vertical sectional view of a friction buffer, illustrating my improvements in connection therewith, said view corresponding substantially to the angular line 1—1 of Figure 4. Figure 2 is a front end elevational view of Figure 1, that is, looking toward the right in said figure. Figure 3 is a transverse, vertical sectional view, on an enlarged scale, corresponding substantially to the line 3—3 of Figure 1, the spring means being omitted. Figure 4 is a transverse, vertical sectional view, on an enlarged scale, corresponding substantially to the line 4—4 of Figure 1, the spring means being omitted. Figure 5 is a broken rear elevational view of the friction casing of the mechanism shown in Figure 1, that is, looking toward the left in said figure.

The friction buffer, as shown in the drawing, includes a friction casing 10 of hexagonal, transverse cross section throughout its length, having a friction shell section proper 11 at its forward end, which is of hexagonal, interior and exterior cross section. The friction shell section 11 is of well-known design and has a friction clutch slidingly telescoped therein, the friction clutch comprising a central wedge block 12 and three friction shoes 13—13—13 surrounding the block. As is well known, the wedge block 12 has wedging engagement with the shoes 13 and the latter have sliding frictional engagement with the interior walls of the hexagonal friction shell section of the casing. The wedge block 12 has its outward movement limited by three inturned stop lugs 14—14—14 at the forward end of the casing with which three radial arms or lugs 15—15—15 on said wedge block are engageable. As is the usual practice, the arms or lugs 15—15—15 extend between adjacent friction shoes to hold the wedge block against rotation, with the arms aligned with the lugs 14—14—14. The casing 10 contains the usual spring means, which yieldingly opposes inward movement of the clutch and spring cap, comprising a plurality of helical coil spring members. This spring means, as shown, comprises a heavy outer coil 16 and relatively lighter front and rear, inner coils 17 and 18 having a pressure transmitting thimble 19 interposed therebetween.

As shown in the drawing, my improvements comprise broadly a preliminary spring cap A slidable within the rear end of the casing 10, having shouldered engagement with the latter to restrict outward movement of the cap and anchor the same to the casing, and a combined spring abutment and locking sleeve B for holding the cap against rotation.

In carrying out my improvements, the casing 10 is provided with an inturned, continuous flange 20 at its rear end, defining a central opening 21 of substantially circular shape to accommodate the spring cap. The inner edge portion of the flange 20 is provided with three notches or recesses 22, 23, and 24 extending therethrough and communicating with the opening 21. The notches or recesses 22, 23, and 24 extend radially to the longitudinal axis of the mechanism and serve as openings through which the retaining lugs of the cap A, hereinafter described, freely pass in assembling the mechanism. The notches or recesses 22, 23, and 24 are all of the same width, but the notch or recess 22 is of greater depth in radial direction than the notches 23 and 24. The flange 20 serves as a stop for limiting outward movement of the cap A and also has an abutment wall for the combined spring abutment and locking sleeve B.

The spring cap A, which is slidable within the rear end of the casing 10, comprises a cylindrical shell portion 25, closed at its outer end by a transverse wall 126, which extends laterally outwardly beyond the shell portion at all sides thereof to form a platelike follower section which cooperates in a well-known manner with the usual buffer stem of the buffing means of a railway car. The shell portion 25 has three radially outwardly projecting lugs 26, 27, and 28 at its inner end, which overhang and are engaged in back of the stop flange 20 of the casing to limit outward movement of the cap. The lug 26, as shown most clearly in Figure 4, is of greater length than the lugs 27 and 28, that is, it projects radially outwardly a greater distance from the shell of the cap A than the lugs 27 and 28. In applying the cap A to the casing 10, the shell section thereof is entered through the opening 21 of the casing, being turned to such a position that the lugs 26, 27, and 28 thereof register with the recesses 22, 23, and 24, respectively, to pass freely therethrough. After the cap A has been pushed inwardly of the casing to a sufficient extent to bring the lugs thereof inwardly of the flange 20 of the casing, the cap is given a partial turn to position the lugs in engaging relation with the flange 20, as shown in Figure 4.

The combined spring abutment and locking sleeve B is in the form of a cylindrical tube having internal and external, transverse, annular flanges 29 and 129 at its inner or left hand end, as seen in Figure 1, the flanges 29 and 129 together forming an end wall provided with a central opening 30 through which the rear coil 18 of the inner spring of the spring means of the mechanism extends. The external flange 129 of the cap A is notched, as indicated at 130—130—130, to provide clearance for the lugs 14—14—14 of the casing in assembling the combined spring abutment and locking sleeve B with the casing 10. At the outer or right hand end, the side wall of the sleeve B is notched, or recessed, at one side of said sleeve to provide a locking seat 31 cooperating with a locking projection 32 on the casing 10, the projection 32 being in the form of a radially inwardly projecting short rib on the inner side of the flange 20 of the casing, extending from one side wall of the latter. The outer coil 16 of the spring has its inner end bearing on the combined abutment and locking sleeve B, holding the same seated with the locking projection 32 engaged in the seat 31, thereby preventing rotation of the sleeve with respect to the casing 10. The internal diameter of the shell 25 of the sleeve B is such that sufficient clearance is provided to accommodate the relatively short lugs 27 and 28 of the cap A freely therein. At the side of the sleeve B, diametrically opposite to the seat 31, the wall thereof is longitudinally slotted to provide a guideway or slot 33, which opens through the outer end of the sleeve and within which the outer end of the lug 26 of the spring cap A is engaged for sliding movement lengthwise of the mechanism. The cap A is thus locked against rotation with respect to the casing 10.

The inner spring means, comprising the coils 17 and 18, extends through the combined spring abutment and locking sleeve B into the cap A, having its rear end bearing on the end wall 126 of the latter. The inner spring of the spring means opposes inward movement of both the friction clutch and the spring cap, while the outer spring opposes inward movement of the friction clutch only.

In assembling the mechanism, the preliminary spring cap A is inserted within the casing 10, through the rear end thereof, and turned through an angle of 30 degrees to engage the lugs 26, 27, and 28 with the stop flange 20 of the casing. The combined spring abutment and locking sleeve B is then inserted through the front end of the casing, turned so that the notches 130—130—130 of the flange 129 are aligned with the lugs 14—14—14 of the casing to clear the latter, and moved inwardly and engaged over the inner end of the cap A, with the lug 26 of the latter engaged within the guideway 33, and the seat 31 of the sleeve engaged over the locking projection 32 of the casing, thereby locking the cap A against rotation with respect to the casing 10. The springs and the friction clutch are then applied by inserting the same through the front end of the casing, and the lugs 15—15—15 of the wedge engaged in back of the lugs 14—14—14 in the usual manner. As will be evident, in the assembled condition of the mechanism, the outer spring 16 at all times holds the combined spring abutment and locking sleeve seated on the flange 20 at the rear end of the mechanism and in locking engagement with the projection 32 of the casing to prevent rotation of said member.

The operation of my improved mechanism is as follows: As the mechanism is compressed, the preliminary spring cap A is first forced inwardly of the casing against the resistance of the inner springs 17 and 18, producing preliminary spring action, the static friction between the shoes and the casing being sufficiently great during this action to hold the friction clutch against movement inwardly of the casing. This action continues until the projecting flange portion of the rear wall 126 of the preliminary spring cap A comes into engagement with the rear end of the casing 10, whereupon further compression of the mechanism forces the wedge 12 inwardly of the casing, spreading the shoes apart, sliding the same inwardly of the casing on the friction surfaces of the same, and compressing the springs 16, 17, and 18, thereby producing high shock absorbing capacity.

In release of the mechanism, the springs force the wedge, shoes, and preliminary spring cap A outwardly, thereby restoring the parts to their normal full release position, outward movement of the wedge being limited by shouldered engagement with the lugs 14—14—14 of the casing and outward movement of the cap A being limited by engagement of the lugs 26, 27, and 28 thereof with the stop flange 20.

I claim:

1. In a friction shock absorbing mechanism, the combination with a friction casing having interior friction surfaces at one end thereof; of a friction clutch slidingly telescoped within said end of the casing; a spring cap slidingly telescoped within the other end of the casing; stop means on said casing limiting outward movement of the clutch; circumferentially spaced stop shoulders at said second named end of the casing; radially projecting lugs on said cap, longitudinally aligned and engageable with said circumferentially spaced stop shoulders; a spring abutment within said casing into which said cap extends; interengaging guide means on said abutment and cap for holding the cap against rotation with respect to said spring abutment; interengaging locking means on said casing and abutment for holding the latter against rotation with respect to the casing; a spring interposed between said clutch and spring abutment for holding the abutment seated with the locking means thereof engaged with the locking means of the casing; and spring means within the casing reacting between said clutch and spring cap and yieldingly resisting inward movement of said clutch and cap.

2. In a friction shock absorbing mechanism, the combination with a friction casing; of a friction clutch slidingly telescoped within one end of the casing; a spring cap slidingly telescoped within the other end of the casing; means on said casing for limiting outward movement of the clutch; a stop flange at the second named end of the casing; stop lugs on said cap engageable with said stop flange to limit outward movement of the cap, said stop flange being notched to allow said cap to be entered through said second named end of the casing when turned to align the lugs thereof with the notches of said stop flange; a combined spring abutment and locking member within said casing into which said cap extends; cooperating guide means on said member and cap of tongue and groove formation for restricting said cap to movement in a direction lengthwise of said member, said member having shouldered engagement with the casing to hold the former against rotation with respect to the latter; and spring means within the casing yieldingly opposing inward movement of said clutch and cap, said spring means including a spring member buttressed against said spring abutment and holding the latter in its shouldered engagement with the casing.

3. In a friction shock absorbing mechanism, the combination with a friction casing; of a friction clutch slidingly telescoped within one end of the casing; circumferentially spaced, interior stop shoulders at the other end of the casing; a tubular spring abutment seated on said stop shoulders; a spring cap telescoped within said second named end of the casing and extending into said tubular spring abutment, said cap having radially projecting lugs engageable with said stop shoulders for limiting outward movement of the cap; locking means on the spring abutment and casing of lug and notch formation for locking said spring abutment against rotation; means for restricting said cap to movement lengthwise with respect to the spring abutment, comprising a lengthwise extending guide groove in said abutment within which one of the lugs of the cap is slidingly engaged; spring means within said casing reacting between said clutch and spring cap, yieldingly resisting inward movement thereof; and additional spring means within the casing reacting between said clutch and spring abutment to hold the latter with the locking means of the same and the casing operatively engaged.

4. In a friction shock absorbing mechanism, the combination with a friction casing; of a friction clutch slidingly telescoped within one end of the casing; circumferentially spaced, interior stop shoulders at the other end of the casing; a tubular spring abutment sleeve within the casing seated against said stop shoulders; an interior locking projection on said casing and a cooperating seat in the wall of said sleeve with which said projection is engaged; a spring within the casing having its front and rear ends bearing respectively on said clutch and spring abutment sleeve and holding said sleeve seated against said lugs with the seat thereof engaged with said locking projection to hold the sleeve against rotation with respect to the casing; a spring cap slidingly telescoped within the second named end of the casing; radial stop lugs on said cap engaged with the stop shoulders of the casing to limit outward movement of the cap; interengaging guide means of slot and guide formation on said cap and sleeve for restricting the cap to movement in a direction lengthwise of the mechanism; and a second spring within the casing reacting between the clutch and spring cap and yieldingly resisting inward movement of the latter.

5. In a shock absorbing mechanism, the combination with a tubular casing having an open end; of an inturned stop flange at said open end; a spring cap including a tubular shell section slidingly telescoped within said open end of the casing, said cap having radially outwardly projecting stop lugs at the inner end of the shell section engageable with said flange to limit outward movement of the cap, said stop flange being notched to provide clearance for said lugs to permit insertion of the shell section within the casing when the cap is turned to register the lugs thereof with said notches; a locking sleeve within the casing surrounding said shell section of the cap, said sleeve having a lengthwise extending guide slot in the wall thereof within which one of said lugs of the cap is slidingly guided to restrict said cap to movement in a direction lengthwise of said sleeve; a radially inwardly projecting locking rib on said casing at said open end thereof, said sleeve having a seat engaged over said rib to lock the sleeve against rotation with respect to the casing; spring means within the casing yieldingly opposing inward movement of the cap; and additional spring means within the casing bearing on said sleeve and holding the same in position with the seat thereof engaged with said rib of the casing.

GEORGE E. DATH.

REFERENCES CITED

The following references are of record in the file of this patent:

UNITED STATES PATENTS

| Number | Name | Date |
|---|---|---|
| 2,076,769 | Dentler | Apr. 13, 1937 |
| 2,423,876 | Dath | July 15, 1947 |
| 2,434,944 | Marsh | Jan. 27, 1948 |